April 26, 1949. A. GROSSMAN 2,468,399
CASTER FIXTURE

Filed March 18, 1947 2 Sheets-Sheet 1

Inventor
Albert Grossman
by Malcolm W. Fraser
attorney

April 26, 1949.　　　A. GROSSMAN　　　2,468,399
CASTER FIXTURE

Filed March 18, 1947　　　2 Sheets-Sheet 2

Inventor
Albert Grossman
by Malcolm W. Fraser
attorney

Patented Apr. 26, 1949

2,468,399

UNITED STATES PATENT OFFICE 2,468,399

CASTER FIXTURE

Albert Grossman, London, England

Application March 18, 1947, Serial No. 735,388
In Great Britain November 6, 1945

Section 1, Public Law 690, August 8, 1946
Patent expires November 6, 1965

4 Claims. (Cl. 16—18)

The present invention relates to an improved caster, for attachment to a truck, trolley or the like which hereinafter will be called the load.

It is well-known that in order that a caster may function smoothly the axis of the caster wheel, roller, ball or the like should trail behind the point of attachment of the caster to the load, and it is an object of the present invention to provide improved means for achieving this end, rendering the caster capable of functioning on level surfaces or on tracks or rails, either straight or curved, without the caster wheel having to be swivelled through 180° as is necessary with the known types of caster.

According to the present invention there is provided a caster including an upper plate adapted to be secured to a load, a lower plate, a wheel carried by the lower plate and means for holding the two plates loosely together so as to permit limited relative rectilinear displacement of the plates.

According to another feature of the present invention there is provided a caster including an upper plate adapted to be secured to a load and formed on its lower face with a pair of spaced parallel rectilinear grooves, a lower plate formed on its upper face with a pair of grooves similar to those on the upper plate, bearings in said grooves, a wheel rotatably mounted on the lower plate and means for holding the two plates loosely together so as to permit limited relative rectilinear displacement of the plates.

Figure 1:
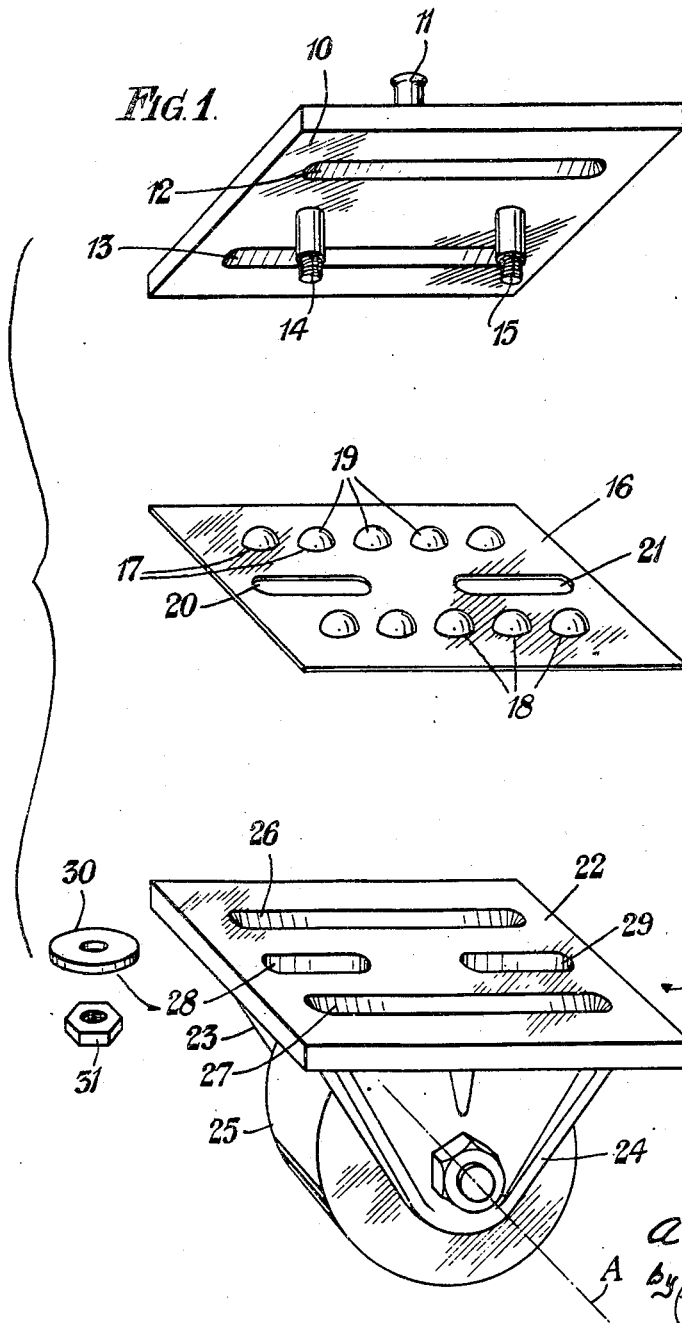
Figure 2:
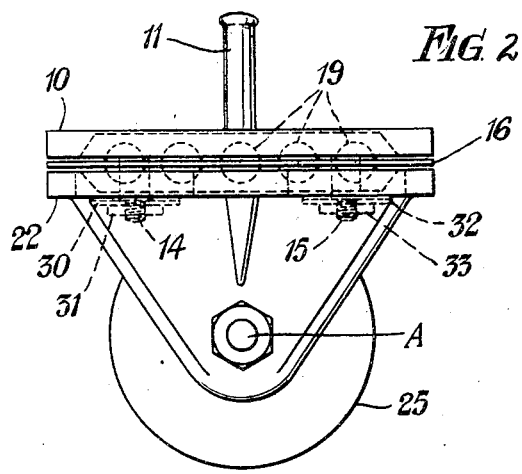
Figure 3:
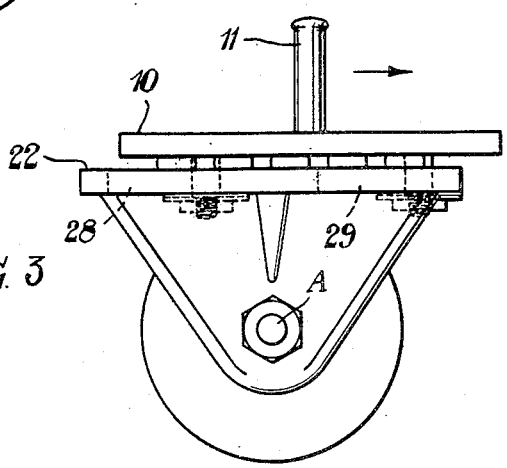
Figure 4:
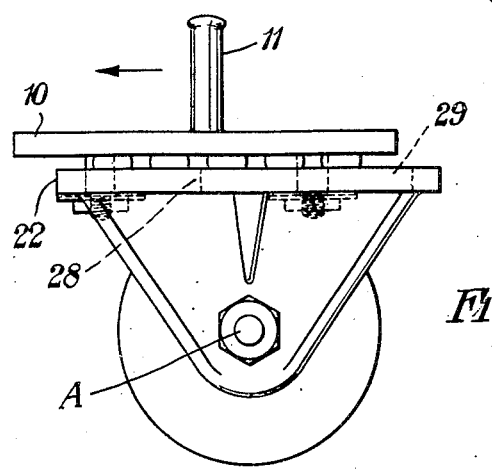

A preferred embodiment of the invention will now be described with reference to the accompanying diagrammatic drawings, in which Figure 1 is a perspective view of the several parts of the device arranged in exploded positions Figure 2 is an elevation of the caster shown in Figure 1, and Figures 3 and 4 are views similar to Figure 2 but showing the upper and lower parts of the caster in displaced relative positions as compared with the position illustrated in Figure 2.

The device comprises an upper plate 10 on the upper face of which is mounted a king pin 11 adapted to be inserted in an aperture in the load to be carried in such manner that the caster as a whole can pivot on the load about the vertical axis of the pin. If desired a circular ball race may be located between the load and the upper plate, but for simplicity a king pin has been illustrated.

On the under face of the plate 10 are formed two spaced parallel grooves 12 and 13 each of V or U section and midway between them are secured in the plate two vertical studs 14 and 15 the lower ends of which are shouldered and threaded as shown.

Beneath the upper plate 10 is disposed a ball cage 16 formed with two spaced parallel rows of holes 17 and 18 to receive ball bearings 19. Midway between the two rows 17 and 18 the cage 16 is formed with two clearance slots 20 and 21 for the studs 14 and 15.

The cage is held between the upper plate 10 and a lower plate 22 provided with legs 23 and 24 between which a wheel 25 is mounted for rotation about an axis A.

On its upper face the lower plate 22 is formed with a pair of spaced, parallel grooves 26 and 27 shaped and spaced similarly to those in the plate 10. The plate 22 is also formed with a pair of slots 28 and 29 similar to, but slightly less in size than, those in the cage 16.

The caster is assembled by placing the cage 16 and balls 19 on the lower plate 22, so that the two rows of balls run in the grooves 26 and 27 respectively; then placing the upper plate on top of the cage so that the balls run also in the grooves 12 and 13, the studs 14 and 15 meanwhile passing through the slots 20 and 21 in the cage and through the slots 28 and 29 in the lower plate; and finally securing washers and nuts 30 and 31 and 32 and 33 on the protruding threaded ends of the studs 14 and 15 respectively.

The washers 30 and 32 are just clear of the plate 22 owing to the shoulders on the studs 14 and 15.

It will be appreciated that the two plates 10 and 22 may be displaced with respect to one another in the direction of the parallel grooves, the extent of this rectilinear relative displacement being limited by the length of the slots 28 and 29 in which ride the studs 14 and 15 fixed to the upper plate 10.

When the plates lie flush with each other in the position shown in Figure 2, the axis A of the wheel 25 lies vertically below the axis of the king pin 11 and there is no trailing effect of the wheel behind the pin, but if the load is pushed to the right for example (with reference to Figures 2 and 3) the upper plate rides to the right on the lower one until the position shown in Figure 3 is reached where the axis A is trailing behind the pin 11. Conversely if the load is pushed to the left from the position of Figure 2 to the position shown in Figure 4, the plate 10 rides to the left on the plate 22 and again the wheel axis A trails behind the pin 11.

Since the load may be rotated about the axis of the king pin 11 it will be appreciated that the direction of displacement may be brought into any straight line passing through the axis of the king pin.

What I claim is:

1. A caster including an upper plate adapted to be secured to a load, a lower plate, a wheel carried by the lower plate and means for holding the two plates loosely together so as to permit limited relative rectilinear displacement of the plates.

2. A caster including an upper plate adapted to be secured to a load and formed on its lower face with a pair of spaced parallel rectilinear grooves, a lower plate formed on its upper face with a pair of grooves similar to those on the upper plate, bearings in said grooves, a wheel rotatably mounted on the lower plate and means for holding the two plates loosely together so as to permit limited relative rectilinear displacement of the plates.

3. A caster as claimed in claim 2, wherein one of said plates is formed with a slot parallel with its grooves and the other plate carries a stud movable in said slot and serving to limit the relative displacement between the plates.

4. A caster including an upper plate adapted to be secured to a load so that it can pivot about a vertical axis and formed on its lower face with a pair of spaced parallel rectilinear grooves, a lower plate formed on its upper face with a pair of grooves similar to those on the upper plate, bearings in said grooves, a wheel rotatably mounted on the lower plate, a slot in one of said plates and a stud on the other movable in said slot so as to permit a limited relative displacement between the plates.

ALBERT GROSSMAN.

REFERENCES CITED

The following references are of record in the file of this patent:

UNITED STATES PATENTS

| Number | Name | Date |
|---|---|---|
| 1,839,396 | Kimball | Jan. 5, 1932 |